United States Patent
Shiu et al.

(10) Patent No.: US 8,384,352 B2
(45) Date of Patent: Feb. 26, 2013

(54) BATTERY VOLTAGE BALANCE APPARATUS AND BATTERY CHARGE APPARATUS

(75) Inventors: Shian-Sung Shiu, Taipei County (TW); Li-Min Lee, Taipei County (TW); Chung-Che Yu, Taipei County (TW); Ke Peng, Wuxi (CN)

(73) Assignee: Green Solution Technology Co., Ltd., New Taipei (TW)

( * ) Notice: Subject to any disclaimer, the term of this patent is extended or adjusted under 35 U.S.C. 154(b) by 358 days.

(21) Appl. No.: 12/906,142

(22) Filed: Oct. 18, 2010

(65) Prior Publication Data

US 2011/0248675 A1 Oct. 13, 2011

(30) Foreign Application Priority Data

Apr. 13, 2010 (CN) .......................... 2010 1 0146528

(51) Int. Cl.
*H01M 10/46* (2006.01)

(52) U.S. Cl. ........................................................ 320/118
(58) Field of Classification Search .................. 320/116, 320/118, 119, 155
See application file for complete search history.

(56) References Cited

U.S. PATENT DOCUMENTS

| | | | | |
|---|---|---|---|---|
| 7,286,701 | B2 * | 10/2007 | Muraki ........................ | 382/167 |
| 2005/0024015 | A1 * | 2/2005 | Houldsworth et al. ....... | 320/119 |
| 2008/0309286 | A1 * | 12/2008 | Hoff ............................. | 320/107 |
| 2009/0167247 | A1 * | 7/2009 | Bai et al. ...................... | 320/134 |

* cited by examiner

*Primary Examiner* — Edward Tso
(74) *Attorney, Agent, or Firm* — Jianq Chyun IP Office

(57) ABSTRACT

In the related art, the measurement error due to the internal resistance of the battery is not considered in the battery balance method, such that the battery balance is not accurate, or the battery balance process is frequently started and stopped. In exemplary embodiments of the invention, detecting battery voltage and balancing battery voltage are performed in different time, such that the difference of charge current/discharge current among the batteries due to the battery voltage balance process do not affect the battery voltage detecting.

20 Claims, 2 Drawing Sheets

BATTERY VOLTAGE BALANCE APPARATUS AND BATTERY CHARGE APPARATUS

CROSS-REFERENCE TO RELATED APPLICATION

This application claims the priority benefit of China application serial no. 201010146528.1, filed on Apr. 13, 2010. The entirety of the above-mentioned patent application is hereby incorporated by reference herein and made a part of this specification.

BACKGROUND OF THE INVENTION

1. Field of the Invention

The invention generally relates to a battery voltage balance apparatus and a battery charge apparatus. More particularly, the invention relates to a battery voltage balance apparatus and a battery charge apparatus which perform the battery voltage detecting and the battery voltage balancing in different time.

2. Description of Related Art

With the development of portable electronic products, the requirement for chargeable battery is gradually increased. The type of chargeable battery is classified into the conventional nickel-cadmium (NiCd) battery, the advanced nickel-metal hydride (NiMH) battery and lithium ion (Li-ion) battery, and the modern Li-Polymer battery. The voltages provided by the different type of chargeable batteries are different, and the operation voltages of the portable electronic products are also different. Accordingly, the manufacturer may couple a plurality of batteries in series as a battery module to provide the desired voltage depending on the operation voltage of the portable electronic product.

When the energy of the batteries in the battery module has been depleted, a battery charger is needed to charge the battery module for next usage. However, the battery capacities of the batteries in the battery module may be different depending on manufacture and usage. For example, a 7.4V Li battery module is formed by two 3.7V Li batteries coupled in series. Before the two batteries are dispatch from the factory, the battery capacities thereof are respectively 80% and 70%. Because over charging will damage the Li battery, the Li battery charger may stop charging the Li battery module when any of the batteries has been fully charged. At this time, the battery capacities of the two batteries may respectively be 100% (the maximum) and 90%. During usage, when any of the battery capacities has fallen down to 0% (the minimum), the battery module can not be used any more. Accordingly, when the battery capacities of the two batteries have respectively fallen down to 10% and 0%, the battery module must be charged before usage.

As known from above, when the battery capacities of the batteries in the battery module are different, the practical electric power of the battery module for usage is determined according to the battery having the lower battery capacity. Besides, when the battery is not used, the battery may self-discharge. In the condition that the self-discharge rate of each battery is different, the battery capacities thereof will be gradually unbalanced, so that the practical electric power of the battery module for usage also gradually decreases as the time goes on, thereby lowering the efficiency of the battery module and shortening the battery life thereof.

Referring to FIG. 1, it shows a digital battery balance controller which is disclosed in the datasheet of ISL9208 by Intersil. A digital battery balance controller 10 includes a battery balance microcontroller 5 and transistor switches S1-S7. The transistor switches S1-S7 are respectively parallel with batteries BAT1-BAT7 through resistors R1-R7. The voltages of the batteries BAT1-BAT7 are converted to digital signals through A/D converters. According to the digital signals corresponding to the batteries BAT1-BAT7, the battery balance microcontroller 5 determines the battery having the highest voltage by an algorithm built inside, and further, turns on the parallel transistor switch corresponding to the battery having the highest voltage. Accordingly, the charge current of each battery can be adjusted based on the voltage of each battery to achieve the function of charge balance.

However, each battery has internal resistance, and when the charge balance is performed, the charge currents of the batteries are different, i.e. the charge current of the battery having the higher battery voltage is smaller. Accordingly, the measurement for battery voltages is not correct. Especially, for the battery module having the larger battery capacity or charging by fast charging technology, the charge currents are relatively large, such that the measurement errors of battery voltages are also larger.

SUMMARY OF THE INVENTION

Accordingly, in the related art, the measurement error due to the internal resistance of the battery is not considered in the battery balance method, such that the battery balance is not accurate, or the battery balance process is frequently started and stopped. In exemplary embodiments of the invention, detecting battery voltage and balancing battery voltage are performed in different time, such that the difference of charge current/discharge current among the batteries due to the battery voltage balance process do not affect the battery voltage detecting.

An embodiment of the invention provides a battery voltage balance apparatus including a timing control unit, a balance determining unit, and a battery voltage balance unit. The timing control unit alternately determines a detecting timing and a balance timing, wherein the detecting timing and the balance timing do not overlap with each other. The balance determining unit is coupled to a plurality of battery units coupled in series and the timing control unit. The balance determining units detects battery voltages of the battery units during the detecting timing to determine whether to start a battery voltage balance process. The battery voltage balance unit is coupled to the battery units, the balance determining unit, and the timing control unit. When the battery voltage balance process starts, the battery voltage balance unit controls at least one of a charging rate and a discharging rate of the battery unit having a highest battery voltage and at least one of a charging rate and a discharging rate of the battery unit having a lowest battery voltage to have a difference, such that battery voltage difference between any two of the battery units is decreased to within a first predetermined value or a first predetermined percentage.

Another embodiment of the invention provides a battery charge apparatus adapted to charge a battery module. The battery module includes a plurality of battery units coupled in series. The battery charge apparatus includes a charge control unit, a timing control unit, and a balance determining unit. The charge control unit is coupled to a power supply and the battery module and controls the power supply to provide a charge current to charge the battery module. The timing control unit alternately determines a detecting timing and a balance timing, wherein the detecting timing and the balance timing do not overlap with each other. The balance determining unit is coupled to a plurality of battery units and the timing control unit. The balance determining units detects battery voltages of the battery units during the detecting timing to determine whether to start a battery voltage balance process. The battery voltage balance unit is coupled to the battery units, the balance determining unit, and the timing control unit. When the battery voltage balance process starts, the battery voltage balance unit controls a charging rate a of the battery unit having a highest battery voltage and a charging rate of the battery unit having a lowest battery voltage to have a difference, such that battery voltage difference between any two of the battery units is decreased to within a first predetermined value or a first predetermined percentage.

It is to be understood that both the foregoing general description and the following detailed description are exemplary, and are intended to provide further explanation of the invention as claimed. In order to make the features and the advantages of the invention comprehensible, exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
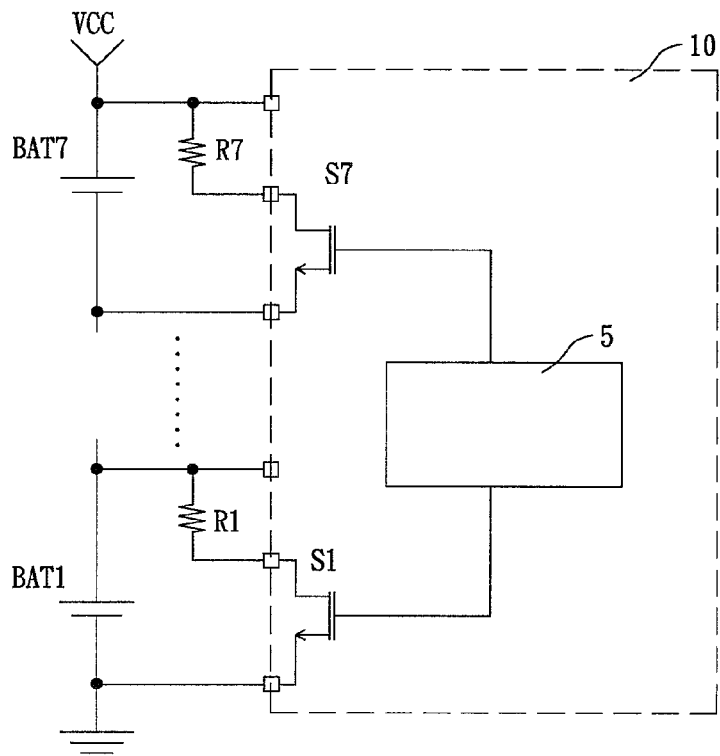
FIG. 1 shows a digital battery balance controller which is disclosed in the datasheet of ISL9208 by Intersil.
Figure 2:
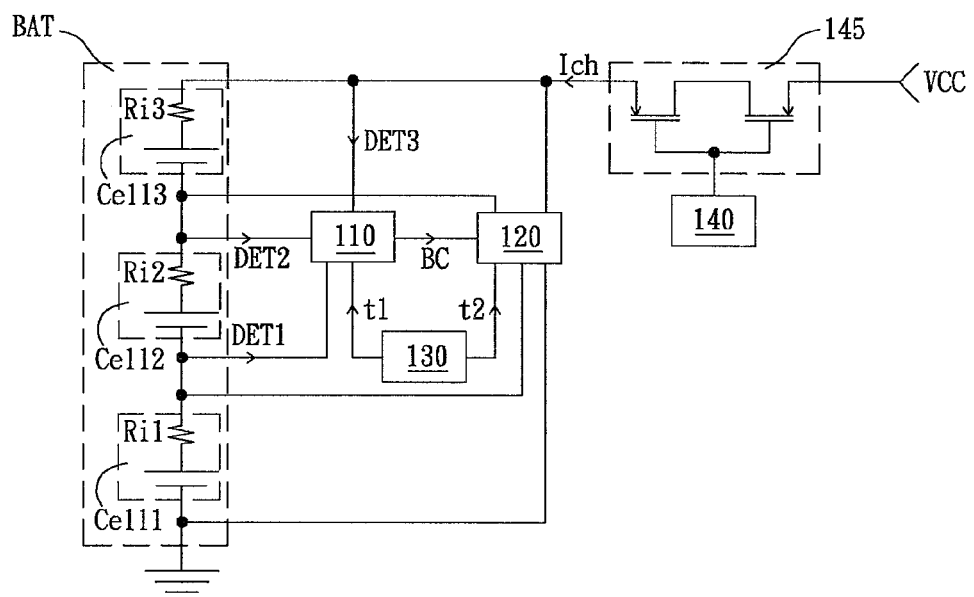
FIG. 2 is a schematic block diagram of a battery charge apparatus according to an embodiment of the invention.

FIG. 2 is a schematic block diagram of a battery charge apparatus according to an embodiment of the invention. Referring to FIG. 2, the battery charge apparatus includes a charge control unit 140, a balance determining unit 110, a battery voltage balance unit 120, and a timing control unit 130. The battery charge apparatus is used to charge a battery module BAT. Herein, the battery module BAT includes a plurality of battery units coupled in series, and the balance determining unit 110, the battery voltage balance unit 120, and the timing control unit 130 form a battery voltage balance apparatus. In the present embodiment, the battery module BAT including the battery units Cell1, Cell2, and Cell3 is exemplary.

The charge control unit 140 is coupled to a charge switch 145 coupled with a power source VCC and the battery module BAT, and controls the charging and discharging of the battery module BAT by the charge switch 145. Accordingly, the charge control unit 140 determines whether to provide a charge current Ich from the power source VCC to the battery module BAT to charge the battery module BAT. The timing control unit 130 alternately generates a first timing signal t1 and a second timing signal t2 to the balance determining unit 110 and the battery voltage balance unit 120, so as to control their operation. That is, the first timing signal t1 and the second timing signal t2 respectively represents a detecting timing and a balance timing. Moreover, the detecting timing and the balance timing do not overlap with each other, such that the timing of the balance determining unit 110 detecting the battery units Cell1, Cell2, and Cell3 and the timing of the battery voltage balance unit 120 balancing the battery units Cell1, Cell2, and Cell3 do not overlap with each other.

The balance determining unit 110 is coupled to the battery module BAT and the timing control unit 130. When receiving the first timing signal t1, the balance determining unit 110 determines whether to perform a battery voltage balance process according to battery voltage detecting signals DET1, DET2, and DET3 of the battery units Cell1, Cell2, and Cell3. When the voltage difference between any two of the battery units Cell1, Cell2, and Cell3 is higher than a predetermined percentage or a predetermined voltage difference, the balance determining unit 110 generates a balance start signal BC to start the battery voltage balance process. The balance start signal BC is used to inform the battery voltage balance unit 120 of the conditions of the battery units in the battery module BAT. Accordingly, the balance start signal BC may be a single signal or a combination of many signals according to the number of the battery units in the battery module BAT.

The battery voltage balance unit 120 is coupled to the balance determining unit 110, the battery module BAT, and the timing control unit 130. When receiving the balance start signal BC and the second timing signal t2, the battery voltage balance unit 120 performs the battery voltage balance process. The battery voltage balance unit 120 determines which one of the battery units in the battery module BAT has the highest battery voltage or which one of the battery units in the battery module BAT has the lowest battery voltage, so as to control a charging rate and/or a discharging rate, i.e. the charge current and/or the discharge current, of the battery unit having the highest battery voltage and a charging rate and/or a discharging rate, i.e. the charge current and/or the discharge current, of the battery unit having the lowest battery voltage to have a difference. Accordingly, the voltage difference of the highest battery voltage and the lowest battery voltage is gradually decreased, and when the voltage difference of any two of the battery units in the battery module BAT decreases to within a predetermined stopping voltage difference or a predetermined stopping voltage difference percentage, the balance determining unit 110 stops the battery voltage balance process.

Accordingly, when the battery voltage balance unit 120 performs the battery voltage balance process, and thereby the currents of the battery units in the battery module BAT are different, the balance determining unit 110 stops detecting the battery voltages of the battery units to avoid an inaccurate detecting due to the different value of the currents flowing through internal resistors Ri1, Ri2, and Ri3 of the battery units Cell1, Cell2, and Cell3. When the battery voltage balance unit 120 stops performing the battery voltage balance process, the currents of the battery units in the battery module BAT are identical due to that the battery units are connected in series (charge state) or the battery units stays in open-circuit state (non-charge state). At this time, the balance determining unit 110 detects the battery voltages of the battery units to obtain accurate battery voltages, so as to determine whether to start or maintain the battery voltage balance process based on the accurate battery voltages. Therefore, in the present embodiment, by alternately performing battery voltage detecting and battery voltage balancing in different time, the issue of detecting inaccurate battery voltages due to internal battery resistance in the related art could be avoided.

Figure 3:
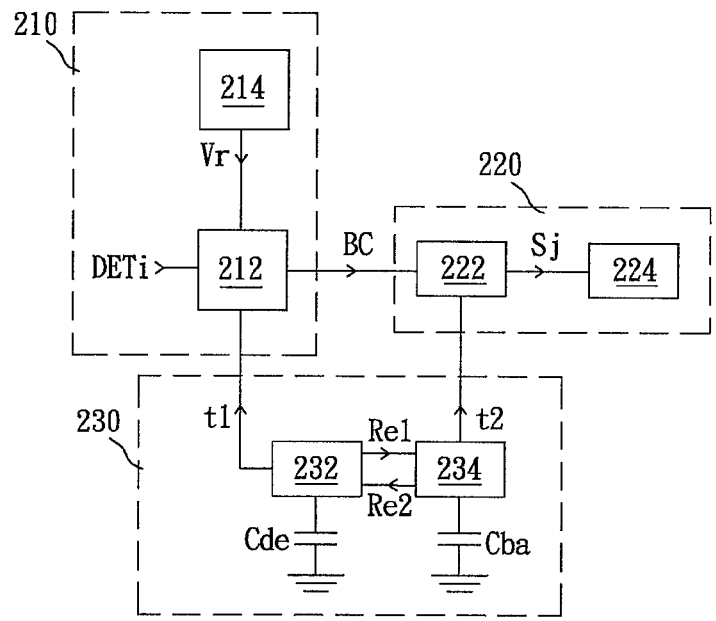
FIG. 3 is a schematic circuit diagram of a battery voltage balance apparatus according to a first embodiment of the invention.

FIG. 3 is a schematic circuit diagram of a battery voltage balance apparatus according to a first embodiment of the invention. Referring to FIG. 3, the battery voltage balance apparatus includes a balance determining unit 210, a battery voltage balance unit 220, and a timing control unit 230. The timing control unit 230 includes a first timing generating circuit 232 and a second timing generating circuit 234. The first timing generating circuit 232 generates a first timing signal t1 to represent a detecting timing by a detecting timing capacitor Cde. The second timing generating circuit 234 generates a second timing signal t2 to represent a balance timing by a balance timing capacitor Cba. When the detecting timing capacitor Cde is charged to a predetermined level by the first timing generating circuit 232, the first timing generating circuit 232 stops generating the first timing signal t1, and further generates a first reset signal Re1 and releases the charge stored in the detecting timing capacitor Cde. The second timing generating circuit 234 is triggered by the first reset signal Re1, and thereby generates the second timing signal t2, and charges the balance timing capacitor Cba. When the balance timing capacitor Cba is charged to a predetermined level, the second timing generating circuit 234 stops generating the second timing signal t2, and further releases the charge stored in the balance timing capacitor Cba and generates a second reset signal Re2 to trigger the first timing generating circuit 232 to generate the first timing signal t1.

The balance determining unit 210 includes a detecting circuit 212 and a reference voltage generating circuit 214. The reference voltage generating circuit 214 generates a reference voltage signal Vr, and the reference voltage signal Vr may be an average battery voltage of the battery units in the battery module BAT. The detecting circuit 212 is coupled to the first timing generating circuit 232, the reference voltage generating circuit 214, and the positive ends and the negative ends of the battery units to receive the reference voltage signal Vr and battery voltage detecting signals DETi, wherein the value i represents the number of the battery units and is an integer larger than 1. Accordingly, the detecting circuit 212 determines whether to start the battery voltage balance process, When receiving the first timing signal t1 and determining the voltage difference between any two of the battery units is higher than a predetermined percentage or a predetermined voltage difference, the detecting circuit 212 generates the balance start signal BC to start the battery voltage balance process.

The battery voltage balance unit 220 includes a balance control circuit 222 and a battery voltage balance circuit 224. The battery voltage balance circuit 224 includes a plurality of transistor switches (not shown) which are respectively parallel to the battery units in the battery module. The battery voltage balance circuit 224 discharges the battery unit having the higher voltage (including the highest voltage) (non-charge state) or decreases the charge current of the battery unit having the higher voltage (charge state). The balance control circuit 222 determines the transistor switch(es) which must be conducted while the battery voltage balance process is preformed according to the balance start signal BC. Next, when receiving the second timing signal t2, the balance control circuit 222 generates a control signal Sj to conduct which transistor switch(es) in the battery voltage balance circuit 224 to adjust the charge or discharge rate of the battery units. Herein, the value j represents the number of the transistor switches in the battery voltage balance circuit 224 and is an integer larger than 1.

By releasing the power stored in the battery unit having the higher voltage or decreasing the charge current of the battery unit, the battery voltage balance apparatus shown in FIG. 3 gradually decreases the voltage differences among the battery units until the voltage difference of any two of the battery units is decreased to within the predetermined stopping voltage difference or the predetermined stopping voltage difference percentage. However, in this case, the power is consumed, and even the temperature of the battery module is inappropriately increased. Accordingly, the battery voltage balance apparatus can adopt a battery voltage balance unit having an energy storage circuit, such that the power is stored in the energy storage circuit, substituted for consuming power. Furthermore, the power stored in the energy storage circuit can charge the battery module. Hence, it reduces the power consumption in the battery voltage balance process. It will be described in detail as follows.

Figure 4:
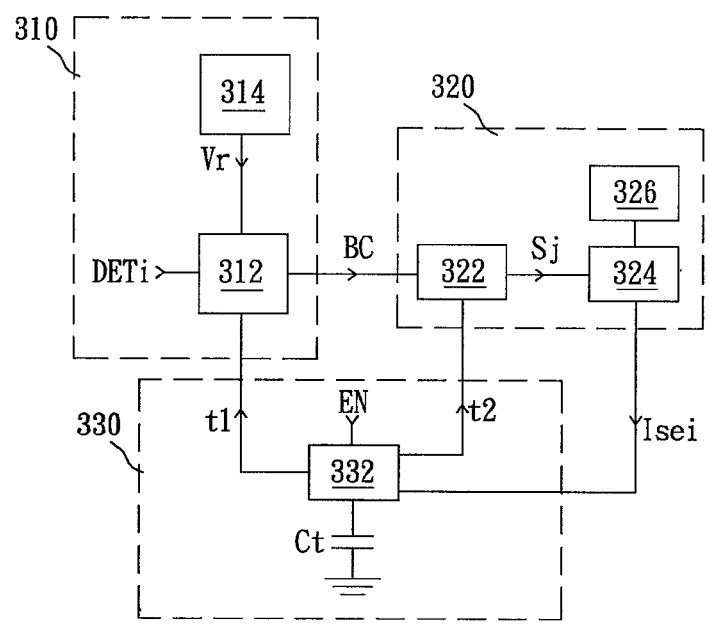
FIG. 4 is a schematic circuit diagram of a battery voltage balance apparatus according to a second embodiment of the invention.

FIG. 4 is a schematic circuit diagram of a battery voltage balance apparatus according to a second embodiment of the invention. Referring to FIG. 4, the battery voltage balance apparatus includes a balance determining unit 310, a battery voltage balance unit 320, and a timing control unit 330. The balance determining unit 310 includes a detecting circuit 312 and a reference voltage generating circuit 314. The battery voltage balance unit 320 includes a balance control circuit 322, a battery voltage balance circuit 324, and an energy storage circuit 326. The timing control unit 330 includes a timing generating circuit 332 and a time capacitor Ct.

The timing generating circuit 332 is coupled to the balance determining unit 310 and the battery voltage balance unit 320. The timing generating circuit 332 determines the period of the detecting timing according to the time capacitor Ct and the period of the balance timing according to a current detecting signal Isei of the battery voltage balance unit 320. In order to cooperate with the battery module in charge process or at a specific time to perform the battery voltage balance process, the timing generating circuit 332 can simply start to determine the detecting timing and the balance timing and correspondingly generates the first timing signal t1 and the second timing signal t2 after receiving a start signal EN. During the detecting timing, the timing generating circuit 332 generates the first timing signal t1. When the detecting circuit 312 receives the first timing signal t1 and determines the voltage difference between any two of the battery units is higher than a predetermined percentage or a predetermined voltage difference according to the battery voltage detecting signals DETi and the reference voltage signal Vr generated by the reference voltage generating circuit 314, the detecting circuit 312 generates the balance start signal BC to start the battery voltage balance process.

When the time capacitor Ct is charged to a predetermined level by the timing generating circuit 332, the timing generating circuit 332 stops generating the first timing signal t1, and further generates the second timing signal t2 and releases the charge stored in the time capacitor Ct. The balance control circuit 322 determines to perform the battery voltage balance process according to the balance start signal BC. When receiving the second timing signal t2, the balance control circuit 322 generates a control signal Sj to conduct the transistor switch(es) in the battery voltage balance circuit 324. Therefore, the power of the battery unit having the higher voltage is transmitted to and stored in the energy storage circuit 326 through the transistor switch(es) in the battery voltage balance circuit 324, and then the power stored in the energy storage circuit 326 is released to charge the battery unit having the lower voltage. The current detecting signal Isei represents the value of the current flowing through the transistor switch(es) in the battery voltage balance circuit 324. When the current detecting signal Isei is smaller than a predetermined value, it means the process of the energy storage circuit 326 charging the battery unit having the lower voltage is going to be finished. Accordingly, the timing generating circuit 332 would stop generating the second timing signal t2 to stop the balance timing and further generate the first timing signal t1 later or at the same time.

In the present embodiment, the timing control unit 330 determines the state of the battery voltage balance process performed by the battery voltage balance unit 320 according to the current detecting signal Isei, and accordingly determines the period of the balance timing. Therefore, in the present embodiment, the timing control unit 330 can cooperate with the battery voltage balance unit 320 according to the practical state, such that the battery voltage balance process is more effectively performed. Moreover, as the timing control unit 230 shown in FIG. 3, the timing control unit 330 may also set the periods of the detecting timing and the balance timing to be constant.

In addition, the battery voltage balance circuit 324 may be a DC-DC converting circuit, such as a DC-DC step-up converter, a DC-DC step-down converter, a DC-DC SEPIC converter, a low dropout regulator (LDO), and a converting circuit capable of converting voltage. The battery voltage balance circuit 324 is used to buck or boost the voltage of at least one of the battery units and store the power to the energy storage circuit 326. For example, when the battery voltage balance circuit 324 is a converting circuit capable of boosting voltage, the battery voltage balance circuit 324 can convert the voltage of the battery unit having the highest voltage into a voltage higher than the voltage of the battery module, i.e. the total voltage of the battery units coupled in series, in the balance timing, for storing the power in the energy storage circuit 326. Then, the stored power is releases to charge the battery module. When the battery voltage balance circuit 324 is a converting circuit capable of bucking voltage, the battery voltage balance circuit 324 can convert the voltage of the battery unit having the highest voltage or the battery module into a voltage higher than the battery unit having the lowest voltage in the balance timing for storing the power in the energy storage circuit 326. Then, the stored power is releases to charge the battery unit having the lowest voltage.

Furthermore, the battery units are frequently charged and/or discharged in the battery voltage balance process, such that the maximum battery capacity or the discharge capability of the battery units is reduced due to memory effect. Accordingly, the balance determining unit can simply generate the balance start signal BC to start the battery voltage balance process when the voltages of the battery units are all within a predetermined battery voltage range or higher than a predetermined battery voltage, wherein the battery units within the predetermined battery voltage range or higher than the predetermined battery voltage have slighter memory effect.

As the above description, the invention completely complies with the patentability requirements: novelty, non-obviousness, and utility. It will be apparent to those skilled in the art that various modifications and variations can be made to the structure of the invention without departing from the scope or spirit of the invention. In view of the foregoing descriptions, it is intended that the invention covers modifications. and variations of this invention if they fall within the scope of the following claims and their equivalents.

What is claimed is:

1. A battery voltage balance apparatus, comprising:
a timing control unit alternately determining a detecting timing and a balance timing, wherein the detecting timing and the balance timing do not overlap with each other;
a balance determining unit coupled to a plurality of battery units coupled in series and the timing control unit, the balance determining units detecting battery voltages of the battery units during the detecting timing to determine whether to start a battery voltage balance process; and
a battery voltage balance unit coupled to the battery units, the balance determining unit, and the timing control unit, when the battery voltage balance process starts, the battery voltage balance unit controlling at least one of a charging rate and a discharging rate of the battery unit having a highest battery voltage and at least one of a charging rate and a discharging rate of the battery unit having a lowest battery voltage to have a difference, such that battery voltage difference between any two of the battery units is deceased to within a first predetermined value or a first predetermined percentage.

2. The battery voltage balance apparatus as claimed in claim 1, wherein the timing control unit comprises at least one capacitor determining periods of the detecting timing and the balance timing.

3. The battery voltage balance apparatus as claimed in claim 1, wherein the timing control unit determines the period of the balance timing according to a value of a current flowing through the battery voltage balance unit.

4. The battery voltage balance apparatus as claimed in claim 1, wherein the balance determining unit comprises an energy storage circuit coupled to the plurality of battery units, and when the battery voltage balance process starts, the energy storage circuit stores energy and selectively charges at least one of the plurality of battery units by the stored energy.

5. The battery voltage balance apparatus as claimed in claim 1, wherein the balance determining unit starts the battery voltage balance process when the battery voltage difference between any two of the plurality of battery units is higher than a second predetermined value or a second predetermined percentage.

6. The battery voltage balance apparatus as claimed in claim 5, wherein the timing control unit comprises at least one capacitor determining periods of the detecting timing and the balance timing.

7. The battery voltage balance apparatus as claimed in claim 5, wherein the timing control unit determines the period of the balance timing according to a value of a current flowing through the battery voltage balance unit.

8. The battery voltage balance apparatus as claimed in claim 5, wherein the balance determining unit comprises an energy storage circuit coupled to the plurality of battery units, and when the battery voltage balance process starts, the energy storage circuit stores energy and selectively charges at least one of the battery units by the stored energy.

9. The battery voltage balance apparatus as claimed in claim 1, wherein the balance determining unit starts the battery voltage balance process when the battery voltage difference between any two of the plurality of battery units is higher than a second predetermined value or a second predetermined percentage and when the battery voltages of the plurality of battery units are within a predetermined battery voltage range or higher than a third predetermined value.

10. The battery voltage balance apparatus as claimed in claim 9, wherein the timing control unit comprises at least one capacitor determining periods of the detecting timing and the balance timing.

11. The battery voltage balance apparatus as claimed in claim 9, wherein the timing control unit determines the period of the balance timing according to a value of a current flowing through the battery voltage balance unit.

12. The battery voltage balance apparatus as claimed in claim 9, wherein the balance determining unit comprises an energy storage circuit coupled to the plurality of battery units, and when the battery voltage balance process starts, the energy storage circuit stores energy and selectively charges at least one of the plurality of battery units by the stored energy.

13. The battery voltage balance apparatus as claimed in claim 12, the balance determining unit further comprises a converting unit bucking or boosting a voltage of at least one of the plurality of battery units and storing the bucked or boosted voltage to the energy storage circuit.

14. A battery charge apparatus, adapted to charge a battery module, wherein the battery module comprises a plurality of battery units coupled in series, the battery charge apparatus comprising:
   a charge control unit coupled to a power supply and the battery module and controlling the power supply to provide a charge current to charge the battery module;
   a timing control unit alternately determining a detecting timing and a balance timing, wherein the detecting timing and the balance timing do not overlap with each other;
   a balance determining unit coupled to the plurality of battery units and the timing control unit and detecting battery voltages of the plurality of battery units during the detecting timing to determine whether to start a battery voltage balance process; and
   a battery voltage balance unit coupled to the plurality of battery units, the balance determining unit, and the timing control unit, when the battery voltage balance process starts, the battery voltage balance unit controlling a charging rate of the battery unit having a highest battery voltage and a charging rate of the battery unit having a lowest battery voltage to have a difference, such that battery voltage difference between any two of the plurality of battery units is decreased to within a first predetermined value or a first predetermined percentage.

15. The battery charge apparatus as claimed in claim 14, wherein the balance determining unit comprises an energy storage circuit coupled to the battery units, and when the battery voltage balance process starts, the energy storage circuit stores energy and selectively charges at least one of the plurality of battery units by the stored energy.

16. The battery charge apparatus as claimed in claim 14, wherein the balance determining unit starts the battery voltage balance process when the battery voltage difference between any two of the plurality of battery units is higher than a second predetermined value or a second predetermined percentage.

17. The battery charge apparatus as claimed in claim 16, wherein the balance determining unit comprises an energy storage circuit coupled to the plurality of battery units, and when the battery voltage balance process starts, the energy storage circuit stores energy and selectively charges at least one of the plurality of battery units by the stored energy.

18. The battery charge apparatus as claimed in claim 16, wherein the balance determining unit starts the battery voltage balance process when the battery voltage difference between any two of the plurality of battery units is higher than a second predetermined value or a second predetermined percentage and when the plurality of battery voltages of the battery units are within a predetermined battery voltage range or higher than a third predetermined value.

19. The battery charge apparatus as claimed in claim 18, wherein the balance determining unit comprises an energy storage circuit coupled to the plurality of battery units, and when the battery voltage balance process starts, the energy storage circuit stores energy and selectively charges at least one of the plurality of battery units by the stored energy.

20. The battery charge apparatus as claimed in claim 14, the balance determining unit further comprises a converting unit bucking or boosting a voltage of at least one of the plurality of battery units and storing the bucked or boosted voltage to the energy storage circuit.

\* \* \* \* \*